(12) United States Patent
Masse

(10) Patent No.: US 6,451,913 B1
(45) Date of Patent: Sep. 17, 2002

(54) RADIAL HYDROGENATED BLOCK COPOLYMERS SHOWING ONE PHASE MELT BEHAVIOR

(75) Inventor: Michael Alan Masse, Katy, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 09/643,019

(22) Filed: Aug. 21, 2000

Related U.S. Application Data

(60) Provisional application No. 60/151,935, filed on Sep. 1, 1999.

(51) Int. Cl.$^7$ ................................................ C08L 53/00
(52) U.S. Cl. ........................... 525/98; 525/89; 525/316
(58) Field of Search .................... 525/98, 89, 316

(56) References Cited

U.S. PATENT DOCUMENTS

| | | | |
|---|---|---|---|
| RE27,145 E | 6/1971 | Jones | 260/880 |
| 3,670,054 A | 6/1972 | De La Mare et al. | 260/880 B |
| 3,700,633 A | 10/1972 | Wald et al. | 260/880 B |
| 4,163,031 A * | 7/1979 | Hannon | 525/98 |
| 5,266,648 A | 11/1993 | Masse | 525/314 |
| 5,461,111 A * | 10/1995 | Modic et al. | 525/98 |
| RE36,757 E * | 6/2000 | Himes | 525/98 |

* cited by examiner

*Primary Examiner*—James J. Seidleck
*Assistant Examiner*—Olga Asinovsky

(57) ABSTRACT

Radial block copolymers that exhibit one phase melt behavior at a temperature below the degradation temperature of the radial block copolymer. The radial block copolymers have a plurality of arms, wherein each arm has a numerical average molecular weight of from about 5,000 to about 30,000, each arm includes a monoalkenyl aromatic hydrocarbon block and a hydrogenated conjugated diolefin block, and the monoalkenyl aromatic hydrocarbon is preferably present in an amount of from about 10 wt % to about 40 wt % of the radial block copolymer. Also disclosed is a process for preparing the one phase melt block copolymers.

18 Claims, 2 Drawing Sheets

RADIAL HYDROGENATED BLOCK COPOLYMERS SHOWING ONE PHASE MELT BEHAVIOR

This application claims the benefit of U.S. Provisional Application No. 60/151,935, filed Sep. 1, 1999, the entire disclosure of which is hereby incorporated by reference.

BACKGROUND OF THE INVENTION

1. Field of the Invention

This invention generally relates to radial polymers. More particularly, the invention relates to radial polymers which have and exhibit one phase melt behavior, and to a process for the preparation of such polymers.

2. Background of the Related Art

The preparation of block copolymers is well known. In a synthetic method an initiator compound is used to start the polymerization of one monomer block. The reaction is allowed to proceed until all of the monomer is consumed resulting in a living homogeneous polymer. To this living polymer is added a second monomer block which is chemically different from the first. The living end of the first polymer serves as the site for continued polymerization until terminated, thereby incorporating the second monomer as a distinct block into the linear polymer.

Termination converts the living end of the block copolymer into a non-propagating species, thereby rendering the polymer unreactive toward monomer block or coupling agent. A polymer so terminated is commonly referred to as a diblock copolymer. Alternately, the living block copolymers can be reacted with multifunctional condensing agents commonly referred to as coupling agents. Coupling of the living ends results in linear polymers or radial polymer having at least three arms.

This synthetic approach allows the construction of materials of great practical utility. When the two blocks are sufficiently dissimilar they will not mix but will be microphase separated. This condition is to be distinguished from ordinary phase separation in that the two dissimilar materials are connected through chemical bonds. As such, the two blocks become segregated but are not allowed to migrate away from each other. This microphase separated condition may persist in both the solid and melt states.

When radial polymers possess dissimilar blocks which are rubbery and glassy, a full range of material characteristics can be achieved, from thermoplastic elastomer to impact toughened thermoplastic. If the central block is rubbery and the endblocks are glassy then the useful rubbery character of these materials arises from the constrained nature of the rubbery chains. Each end of the rubbery block is anchored in a glassy block. As a result, the mechanical energy is elastically stored in a rubber chain extension when the material is subjected to a bulk deformation. Since this microphase separated condition commonly exists in both the solid and melt states of radial block copolymers, a mechanism for elastically storing energy exists even in melts.

While the microphase separated state grants useful properties, copolymers which are microphase separated in the melt state generally have very high melt viscosities and high melt elasticities. One commercially used class of polymers having this microphase separation are KRATON G Rubbers (Trademark of Shell Oil Company) which are hydrogenated block copolymers comprising blocks of styrene and blocks of a hydrogenated diene. When melt state block copolymers are microphase separated, the high melt viscosities lead to high energy costs for block copolymer melt processing and can cause polymer degradation by requiring high melt processing temperatures. In some instances, the block copolymers cannot be melt processed in melt processing equipment unless processing aids such as oils and thermoplastic resins are incorporated. Further, the phase separated nature of the block polymer in conjunction with the high viscosities makes melt compounding of these block copolymers with other components difficult and often results in poor mixing. The high melt viscosities exclude the block copolymers from easier melt processing methods such as melt conveying and melt mixing. Furthermore, the use of melt state microphase separated copolymers in applications such as hot melt sealant and pressure sensitive adhesion (PSA) formulation are limited. A high melt elasticity also contributes to fiber fracture which further limits the use of melt state microphase separated copolymers during such applications as melt spinning of fibers.

Recent theoretical and practical work performed in this polymer field has outlined the thermodynamics controlling the microphase separated character of block copolymers. The character of the block copolymer, either as microphase separated or homogeneous, is determined by a combination of four variables: the chemical types of the constituent blocks and the resulting thermodynamic interaction between them, the molecular weights of the blocks, the relative amounts of the blocks, and the temperature. Any one variable alone is not sufficient to describe the thermodynamic state of the block copolymer and the block's copolymer's resulting morphology and mechanical behavior. All four variables have to be specified in order to determine the block copolymer's thermodynamic state.

The three material variables and the temperature for determining the thermodynamic state of radial block copolymers of monoalkenyl aromatic hydrocarbons and conjugated diolefins was described in U.S. Pat. No. 5,266,648, Masse, entitled "One Phase Melt Radial Polymer" which was issued on November 30, 1993. The '648 patent discloses radial block copolymers which exhibit one phase melt behavior that provides superior viscosity properties than melt phase separated copolymers. However, the '648 copolymers are non-hydrogenated block copolymers, and are not a substitution for the use of hydrogenated block copolymers such as KRATON G Rubbers.

Therefore, there remains a need for hydrogenated block copolymers exhibiting a one phase melt at acceptable temperatures. In particularly, it would be beneficial if the block copolymers would have low molecular weights, low melt viscosities, and low melt elasticities.

SUMMARY OF THE INVENTION

The present invention provides a radial block copolymer and a method to produce a radial block copolymer having monoalkenyl aromatic hydrocarbon blocks and hydrogenated conjugated diolefin blocks, wherein the block copolymer exhibits one phase melt behavior at temperatures below the radial block copolymer degradation temperature. The copolymer produced will have low melt viscosities and low melt elasticities allowing the copolymer to be used in melt processes such as melt conveying and melt mixing as well as in applications such as hot melt sealant and melt spinning of fibers.

In one aspect the invention provides a radial block copolymer having a plurality of arms comprising monoalkenyl aromatic hydrocarbon blocks and conjugated diolefin blocks. The monoalkenyl aromatic hydrocarbon blocks are present in an amount of from about 10 to about 40 wt % of the radial block copolymer, preferably the monoalkenyl aromatic hydrocarbon block is styrene present in an amount of from about 20 to about 30 wt %. The invention preferably includes 1,3-butadiene or isoprene as the conjugated diolefin in the composition of the arms of the copolymer. The arms of the copolymer have a numerical average molecular weight from about 5,000 to about 30,000, and preferably from about 7,000 to about 15, 000.

Another aspect of the invention provides a process for the production of the one phase melt block polymers of monoalkenyl aromatic hydrocarbon blocks and hydrogenated conjugated diolefin blocks comprising polymerizing the monovinyl aromatic, then adding the conjugated diolefin to the polymerized monovinyl aromatic to form a living block copolymer, then adding a multifunctional coupling agent to form the radial block copolymer before hydrogenating the radial block copolymer. The block copolymer produced has the one phase melt characteristics described in the preceding paragraph.

A preferred aspect of the present invention is a radial block copolymer exhibiting one phase melt behavior at temperatures which are below its degradation temperature, the radial block copolymer comprising from about 4 to 8 arms, wherein each of the arms has a molecular weight of from about 7,000 to about 15,000, and wherein the arms comprise blocks of styrene and hydrogenated 1,3-butadiene; and wherein the styrene is present in an amount of from about 20 to about 30 wt % of the radial block copolymer.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
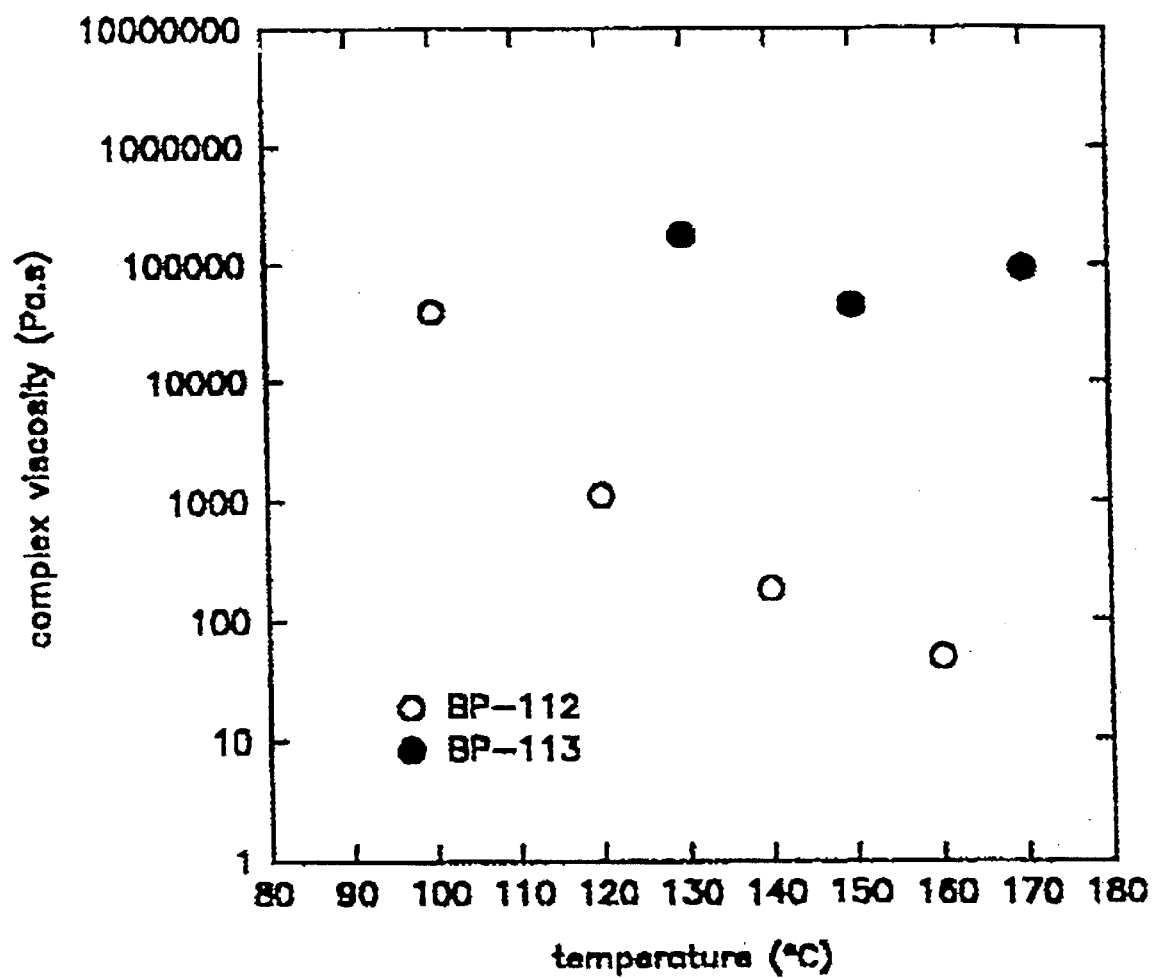
FIG. 1 is a graph plotting the viscosities relative to temperature of polymers produced by the present invention.

The present invention provides radial block copolymers that exhibit one phase melt behavior. The radial block copolymers of this invention include monovinyl aromatic hydrocarbon blocks and hydrogenated conjugated diolefin blocks in at least three arms joined by a coupling agent. The block copolymers are microphase separated at room temperature but achieve a one phase melt state at elevated temperatures below the polymer's degradation temperature.

Monovinyl aromatic hydrocarbon monomers can be used in the practice of the present invention are exemplified by styrene or styrene derivatives inclusive of p-methyl styrene, p-ethyl styrene, and t-butyl styrene. Styrene is the preferred member of this group. As a component of the inventive product, the monovinyl aromatic block is present in an amount within the range of from about 10 to about 40 weight percent (wt %) relative to the copolymer, preferably the monovinyl aromatic block has a range of about 20 to about 30 wt %, and a most preferred amount within the range of from about 28 to 30 wt %. A particularly preferred numerical average molecular weight of the monovinyl aromatic block ranges from about 1,000 to about 6,000.

The conjugated diolefin preferably forms a second block adjacent each monovinyl aromatic hydrocarbon block of the radial block copolymer. Preferred conjugated diolefins are conjugated dienes exemplified by 1,3-butadiene, isoprene, or combinations thereof. The preferred conjugated diene is 1,3-butadiene. The dienes are generally present in the invention in an amount that results in each arm having a numerical average molecular weight from about 5,000 to about 30,0000, preferably from about 7,000 to about 15,000.

It is to be noted that the numerical average molecular weights herein described are true numerical average molecular weights. These are to be distinguished from molecular weights referenced to a chemically or structurally dissimilar reference polymers such as obtained from linear polystyrene standardized gel permeation chromatography when the polymer to be tested is not linear polystyrene.

The medium for conducting the polymerization reaction is a usually purified aprotic organic solvent. Examples of such solvents are cyclic hydrocarbons such as benzene and cyclohexane or linear or branched alkanes such as pentane, hexane, heptane, octane, or isopentane and the like. Mixtures of these solvents are also suitable. Preferably, a cyclic hydrocarbon is used. Most preferably cyclohexane is used. Preferably the solution contains about 6% diethyl ether to provide for about 40% 1,2 addition of 1,3-butadiene to the copolymer.

Initiation of polymerization is achieved by using an organometallic compound suitable for anionic polymerization and soluble in the reaction medium. Preferred among such compounds are alkyl lithium compounds such as methyl lithium, n-butyl lithium, and sec-butyl lithium. Most preferred is sec-butyl lithium. The ratio of initiator to monovinyl aromatic compound is chosen to yield a suitable molecular weight.

The coupling agents used to condense the living block copolymer arms into symmetric radial structures are multifunctional compounds susceptible to nucleophilic attack such as silicon halides, organo-silicon halides, divinyl aromatic compounds, and multifunctional esters, isocyanates and epoxides. The type of coupling agent is chosen to build a radial structure having from 3 to about 30 polymeric arms, preferably from 4 to 8 arms. Silicon halides, organo-silicon halides, and divinyl aromatic compounds are preferred. Most preferred are dimethyl-dichloro-silane, methyl-trichlorosilane, tetrachloro-silane, 1,2-bis(trichloro-silyl) ethane, and 1,6-bis(trichloro-silyl)hexane.

The quantity of coupling agent used is an amount that is sufficient to yield a complete coupling reaction. Quantitatively stated, this amount may range in the ratio of 1:1 of reactive sites on the coupling agent to living chain end. In practice, amounts in the ratios of about 0.9:1 and 0.95:1 have been used satisfactorily.

To accelerate the coupling reaction, an accelerating agent (s) may be employed. These agents are usually polar compounds and are essentially aprotic. Examples of these agents include aromatic ethers, linear alkyl ethers, and cycloalkyl ethers. Particularly preferred accelerating agents are ortho-dimethoxy-benzene, glyme, and diglyme. When employed, these accelerating agents are added in an amount within the range of from about 100 to 1000 ppm based on the amount of the total solution. Amounts in the range of from about 200 to 500 ppm are preferred.

In general, the hydrogenation of the block copolymers or the selective hydrogenation of the conjugated diolefin blocks may be accomplished using any of the several hydrogenation processes known in the prior art. For example the hydrogenation may be accomplished using methods such as those taught, for example, in U.S. Pat. Nos. 3,494,942; 3,634,594; 3,670,054; 3,700,633; and U.S. Pat. No. Re. 27,145, the disclosure of which patents are incorporated herein by reference. The methods known in the prior art and useful in the present invention for hydrogenating polymers containing ethylenic unsaturation and for hydrogenating or selectively hydrogenating polymers containing aromatic and ethylenic unsaturation, involve the use of a suitable catalyst, particularly a catalyst or catalyst precursor comprising an iron group metal atom, particularly nickel or cobalt, and a suitable reducing agent such as an aluminum alkyl.

In general, the hydrogenation will be accomplished in a suitable solvent at a temperature within the range from about 20° C. to about 100° C., and at a hydrogen partial pressure within the range from about 100 psig to about 5,000 psig, preferably about 100 psig to 1,000 psig. Catalyst concentrations comprising from about 10 ppm (wt) to about 500 ppm (wt) of an iron group metal based on total solution are generally used for a period of time within the range from about 60 to about 240 minutes. After the hydrogenation is completed, the hydrogenation catalyst and catalyst residue will, generally, be separated from the block copolymer.

The block copolymers of the present invention are prepared by a four step process. In the first step the monovinyl aromatic hydrocarbon is dissolved in a purified organic solvent and polymerized by using an initiating agent. In general, the initiating agent must begin a reaction mechanism which is capable of forming block copolymers. In practice the initiating agents known to form block copolymers operate by forming a reactive ionic species capable of propagation and polymerization is allowed to proceed until the monovinyl aromatic hydrocarbon is entirely incorporated into the polymer. In the second step a conjugated diolefin is added to the solution typically in a batchwise fashion. As with the monovinyl aromatic hydrocarbon blocks, the polymerization of the conjugated diolefin is allowed to proceed until the second monomer block is completely incorporated in the polymer to form a living diblock copolymer. In the third step a multifunctional coupling agent is added to condense the individual diblock copolymers into radial structures. To expedite this step a compound capable of accelerating the coupling reaction may also be added. In the fourth step, a catalyst and reducing agent is introduced batchwise into a solution containing the copolymer; the copolymer and catalyst in the solution are exposed to a pressurized hydrogen gas to hydrogenate the unsaturated block copolymer.

The polymer prepared by the process disclosed herein is a radial block copolymer. The radial block copolymer is particularly and distinctly described by specifying the chemical identity of the blocks, the relative amounts of the blocks in each arm and the molecular weight of those arms. These three variables, considered together, describe a polymer which possesses the character of low melt viscosities and low melt elasticities by virtue of the copolymer's one phase melt homogeneity at elevated temperatures but below the respective copolymer's degradation temperature.

The radial copolymer will generally have a number of arms of about 3 to about 30 in number, with the arms having a respective numerical average molecular weight of about 5,000 to about 30,000. More precisely described, the inventive block copolymer in addition to other features herein disclosed comprises preferably of from 4 to 8 arms.

The blocks comprising the radial block copolymer become miscible at temperatures below the typical processing temperatures, and most importantly, have a one phase melting temperature below the thermal degradation temperature of either block or the coupling linkage. In the same polymer, the blocks are also immiscible at room temperature. The inventive radial block copolymers are useful as a thermoplastic elastomer at room temperature, exhibit improved processing characteristics below the respective degradation temperature, and can be readily compounded in the melt.

The following examples and tables further illustrate the various aspects of this invention.

EXAMPLE 1

Sample BP-112: 231.2 g of pure cyclohexane were added to a 500 ml septa-capped bottle under nitrogen. 8.5 g of pure styrene monomer was added to the solvent. The impurities in this solution were scavenged by addition of 0.14 ml of sec-butyl lithium. Polymerization was initiated by addition of 2.53 ml of sec-butyl lithium. The polymerizing mixture was stirred at 50° C. for 30 minutes. 20.1 g of pure 1,3-butadiene was added and 13.8 g of diethyl ether was added to the solvent to ensure an approximate 40% 1,2 addition of butadiene to the forming polymer. The reaction was allowed to stir for an additional 120 minutes. Coupling was then performed by adding 3.07 ml of 1,6-bis(trichloro silyl)hexane dropwise over a 1–2 minute period. An accelerator, was added immediately after the coupling agent. The coupling reaction was allowed to proceed at 50° C. for 120 minutes after which the reaction was terminated by addition of dry methanol. Approximately 35.2 g of the radial block polymer was obtained after precipitation of the polymer cement in an excess of stirred isopropyl alcohol at room temperature. The 6-armed polymer was determined to have a numerical average molecular weight of 10,200 for each arm. Styrene made up approximately 28% by weight of the block polymer with a styrene block numerical average molecular weight of 2900.

The recovered polymer is reintroduced into the cement and then transferred to a reactor for hydrogenation, wherein 338.7 grams of cement containing 35.2 g of the radial block polymer and 101.6 g of cyclohexane were added to produce a total solution of 440.3 grams (total volume of 555.4 ml) for processing in the reactor. The hydrogenation reaction was initiated by the addition of 3.7 g of Ni catalyst to the solution under 300 psi pressure and at an initial temperature of 36° C. The hydrogenation proceeded exothermically for about 36 minutes before the second addition of 3.7 g of catalyst. The reaction continued to proceed exothermically for a total of 58 minutes before the final addition of 7.5 g of Ni catalyst. The total added Ni catalyst was approximately 14.9 grams having an approximate concentration in the total solution of about 240 ppm. At 112 minutes the reactor was pressurized to 400 psi and reaction then proceeded for a total of 180 minutes at an approximate temperature of 88° C. The reaction was ended and the hydrogenated polymer was recovered.

EXAMPLE 2

Sample BP-116: 232.2 g of pure cyclohexane were added to a 500 ml septa-capped bottle under nitrogen and 5.8 g of pure styrene was added to the solvent. The impurities in this solution were scavenged by addition of 0.142 ml of sec-butyl lithium. Polymerization was initiated by addition of 2.27 ml of sec-butyl lithium. The polymerizing mixture was stirred at 50° C. for 30 minutes. Then 23.5 g of pure 1,3-butadiene was added and 14.9 g of diethyl ether was added to the solvent to ensure an approximate 40% 1,2 addition of butadiene to the forming polymer. The reaction was allowed to stir for an additional 120 minutes. Coupling was then performed by adding 1.58 ml of tetrachlorosilane dropwise over a 1–2 minute period. An accelerator, was added immediately after the coupling agent. The coupling reaction was allowed to proceed at 50° C. for 120 minutes after which the reaction was terminated by addition of dry methanol. Approximately 27.8 g of the polymer was obtained after precipitation of the polymer in an excess of stirred isopropyl alcohol at room temperature. The 6-armed polymer was determined to have a numerical average molecular weight of 12,300 per arm. Styrene made up approximately 28% by weight of the radial block copolymer with a styrene block numerical average molecular weight of 2400.

The recovered polymer is reintroduced into the cement and then transferred to a reactor for hydrogenation, wherein 264.7 grams of cement containing 27.8 g of the radial block polymer and 82.7 g of cyclohexane were added to produce a total solution of 347.5 grams (total volume of 438.3 ml) for processing in the reactor. The hydrogenation reaction was initiated by the addition of 2.9 g of Ni catalyst to the solution under 300 psi pressure and at an initial temperature of 35° C. The hydrogenation proceeded exothermically for about 36 minutes before the second addition of 2.9 g of catalyst. The reaction continued to proceed exothermically for a total of 46 minutes before the final addition of 5.9 g of Ni catalyst. The total added Ni catalyst was approximately 11.7 grams having an approximate concentration in the total solution of about 240 ppm. The reaction then proceeded for a total of 180 minutes at an approximate temperature of 92° C. The reaction was ended and the hydrogenated polymer was recovered.

The polymerization method described for examples I and II were used to polymerize several radial block copolymers as shown in Table I below.

additives such as thermoplastic resins, oils, solvents, or plasticizers are present in the samples. The reduced viscosity of BP-112 compared to BP-113 is primarily attributable to the difference in phase structure, wherein BP-112 exhibits one phase melt while BP-113 exhibits the typical separate phase melt with correspondingly high melt viscosity characteristics. An example of this effect of one phase melt is shown by the viscosities of BP-112 and BP-113 which differ by nearly a factor of 1000 at the same temperature of 150° C.

The temperature at which the microphase separated structure transitions to one phase melt (the melt becomes homogeneous) is known as the order/disorder transition temperature and is identified as $T_{OD}$. The $T_{OD}$ is determined by the abrupt and significant decrease in the viscosity at the temperature range where the melt's microphase separated character disappears. The $T_{OD}$ analytical value is estimated from the viscosity versus temperature relationships as evidenced in FIG. 1. The derived $T_{OD}$ values are listed in Table I. BP-112 becomes a one phase melt temperature in the temperature range of about 100 to about 120° C. and has an approximate $T_{OD}$ of about 120° C. BP-113 exhibits the characteristics of a two phase melt temperature over the range shown but has an approximate $T_{OD}$ of greater than (>) about 170° C. and may exist as one phase above 170° C. and below a temperature that results in polymer degradation.

Table I contains a summary of analytical data including the transition temperatures of the radial block copolymers produced by the present invention. Practical experience indicates that at temperatures above 280° C. styrene-butadiene polymers begin to suffer thermal breakdown through cross-linking reactions and chain scission.

Figure 2:
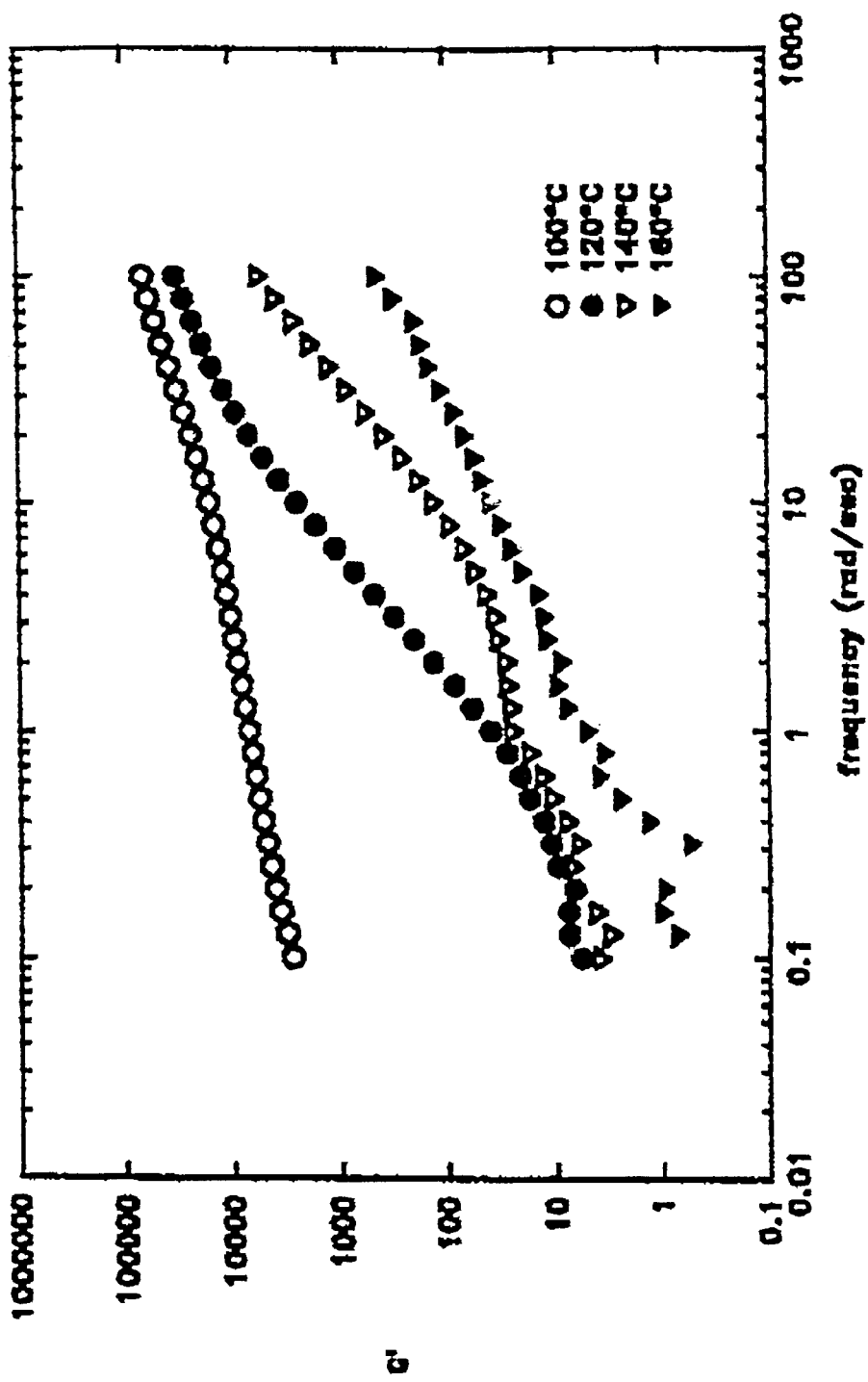
FIG. 2 is a graph showing the elastic modulus of a preferred radial block copolymer which establishes one phase melt behavior below the degradation temperature of the radial block copolymer.

FIG. 2 illustrates the elastic modulus G' as a function of frequency for a variety of temperatures. The sample BP-112 was analyzed by conventional methods and apparatus for the determination of the elastic modulus of the polymer at a series of selected temperatures over a range of frequencies to demonstrate that BP-112 does undergo a transition to one phase melt polymer. In theory, the slope of G' versus frequency should be approximately 2.0 for a one phase melt. The relatively flat modulus is characteristic of phase separated melt as shown at 100° C. At 120° C. and above the slope of the modulus is noticeably increased in the range of 0.1 to 10 radians per second. This is characteristic of a one phase melt.

TABLE 1

Molecular Description of Hydrogenated Polymers

| Polymer ID | Number of Arms | $MW_{styrene}$ | $MW_{butadiene}$ | Polystyrene Content (wt %.) | Hydrogenation Conversion | $T_{od}$ (° C.) |
|---|---|---|---|---|---|---|
| BP-111 | 6 | 2200 | 5600 | 28 | 97.9 | <100 |
| BP-112 | 6 | 2900 | 7300 | 28 | 98.3 | ~120 |
| BP-113 | 6 | 5400 | 14100 | 28 | 98.6 | >170 |
| BP-114 | 6 | 7300 | 21100 | 26 | 98.4 | >200 |
| BP-115 | 4 | 1000 | 9400 | 10 | 98.1 | <100 |
| BP-116 | 4 | 2400 | 9900 | 20 | 98.4 | <100 |
| BP-117 | 4 | 9000 | 8000 | 53 | 98.5 | >200 |
| BP-118 | 4 | 20000 | 4600 | 82 | 97.8 | N/A |

$T_{od}$ is the order/disorder transition temperature associated with the transition from separate phases to miscible phases.

FIG. 1 illustrates the viscosities of BP-112 and BP-113 at various temperatures. The viscosity of these polymers was measured using dynamic mechanical analysis.

The polymer was placed between parallel plates which were oscillated with a 3% strain amplitude at 0.1 rad/sec. No Table II shows the tensile strengths and elasticity of three of the polymers from Table I. Even though all of the polymers have significant tensile strength at room temperature, one of the polymers, BP-112, exhibits a corresponding lower strength because of the weaker phase separation. This relatively low strength of polymers like BP-112 that have a transition temperature less than the respective degradation temperature will be an advantage of low melt viscosities and low melt elasticities when melt functionalization is desired. The one phase melt allows great reduction in viscosity and melt elasticity in processing conditions.

TABLE 2

Mechanical Properties of Hydrogenated Radial Block Copolymers

| Polymer ID | $MW_{arm}$ | $T_{od}$ (° C.) | Tensile Strength (psi) | Elongation/ Polymer strain (%) |
|---|---|---|---|---|
| BP-112 | 10200 | 120 | 619 | 220 |
| BP-113 | 19500 | >170 | 3850 | 580 |
| BP-114 | 28400 | >200 | 6385 | 590 |

$T_{od}$ is the order/disorder transition temperature which is associated with the transition from separate phases to miscible phases.

While foregoing is directed to the preferred embodiment of the present invention, other and further embodiments of the invention may be devised without departing from the basic scope thereof, and the scope thereof is determined by the claims that follow.

What is claimed is:

1. A radial block copolymer, consisting essentially of:
  a plurality of arms comprising a monoalkenyl aromatic hydrocarbon block and a hydrogenated conjugated diolefin block, wherein each arm has a numerical average molecular weight of from about 5,000 to about 30,000; and one phase melt behavior.

2. The radial block copolymer of claim 1, wherein the monoalkenyl aromatic hydrocarbon is styrene.

3. The radial block copolymer of claim 2, wherein the conjugated diolefin is 1,3-butadiene, isoprene, or combinations thereof.

4. The radial block copolymer of claim 3, wherein the styrene is present in an amount of from about 10 wt. % to about 40 wt. %.

5. The radial block copolymer of claim 4, wherein each arm has a numerical average molecular weight of from about 7,000 to about 15,000.

6. The radial block copolymer of claim 4, wherein the styrene is present in an amount of from about 20 wt. % to about 30 wt. %.

7. A radial block copolymer exhibiting one phase melt behavior without degradation, consisting essentially of from about 3 to about 30 arms, wherein each arm has a numerical average molecular weight of from about 5,000 to about 30,000 and wherein the arms comprise blocks of styrene and a hydrogenated conjugated diene, and wherein the styrene is present in an amount of from about 10 wt. % to about 40 wt. % of the radial block copolymer.

8. The radial block copolymer of claim 7, wherein the number of arms is from about 4 to about 8, and each of the arms has a numerical average molecular weight of from about 7,000 to about 15,000.

9. The radial block copolymer of claim 8, wherein the conjugated diolefin is 1,3-butadiene, isoprene, or combinations thereof.

10. The radial block copolymer of claim 9, wherein the styrene is present in an amount of from about 20 wt. % to about 30 wt. %.

11. The radial block copolymer of claim 10, wherein the number of arms is 6 and each arm contains styrene in an amount from about 20 wt. % to about 30 wt. %.

12. A process for the preparation of a hydrogenated radial block copolymer having one phase melt behavior, consisting essentially of:
  polymerizing monovinyl aromatic hydrocarbon blocks;
  adding conjugated diolefin blocks to the monovinyl aromatic hydrocarbon blocks to form living block copolymers having a numerical average molecular weight from about 5,000 to about 30,000 and monovinyl aromatic hydrocarbon is present in an amount from about 10 wt. % to about 40wt. %;
  adding a multifunctional coupling agent to condense the living block copolymers into radial block copolymers having from 3 to 30 arms, wherein each arm has a numerical average molecular weight from about 5,000 to about 30,000; and
  selectively hydrogenating the radial block copolymer.

13. The process of claim 12, wherein the monovinyl aromatic hydrocarbon is styrene.

14. The process of claim 13, wherein the styrene is present in an amount of from about 20 wt. % to about 30 wt. %.

15. The process of claim 14, wherein the styrene is present in an amount of from about 28%.

16. The process of claim 12, wherein the conjugated diolefin is 1,3-butadiene, isoprene, or combinations thereof.

17. The process of claim 12, wherein each arm has a numerical average molecular weight of from about 7,000 to about 15,000.

18. The process of claim 12, wherein the multifunctional agent is 1,6-bis(trichlorosilyl)hexane or tetrachloro-silane.

* * * * *